United States Patent [19]

Barthel et al.

[11] Patent Number: 5,591,797

[45] Date of Patent: Jan. 7, 1997

[54] TRANSITION METAL-CONTAINING HYDROPHOBIC SILICA

[75] Inventors: Herbert Barthel, Emmerting; Frank Achenbach, Simbach am Inn, both of Germany

[73] Assignee: Wacker-Chemie GmbH, Munich, Germany

[21] Appl. No.: 326,903

[22] Filed: Oct. 21, 1994

[30] Foreign Application Priority Data

Oct. 25, 1993 [DE] Germany .................. 43 36 345.8
Jan. 20, 1994 [DE] Germany .................. 44 01 598.4

[51] Int. Cl.$^6$ ................................. C08K 3/34
[52] U.S. Cl. .................. 524/493; 524/588; 106/482; 106/490
[58] Field of Search ................ 106/482, 490; 524/493, 588

[56] References Cited

U.S. PATENT DOCUMENTS

| 4,030,940 | 6/1977 | Chuiko | 106/309 |
| 4,164,509 | 8/1979 | Läufer | 556/400 |
| 4,208,316 | 6/1980 | Nauroth et al. | 106/490 |
| 4,360,388 | 11/1982 | Nauroth et al. | 106/288 B |
| 5,176,960 | 1/1993 | Shimizu et al. | 106/490 |
| 5,264,522 | 11/1993 | Mize et al. | 524/493 |
| 5,372,795 | 12/1994 | Mühlhofer et al. | 106/490 |

FOREIGN PATENT DOCUMENTS

| 0033843 | 8/1981 | European Pat. Off. . |
| 0046057 | 2/1982 | European Pat. Off. . |
| 231519 | 8/1987 | European Pat. Off. . |
| 0493263 | 7/1992 | European Pat. Off. . |
| 266578 | 4/1989 | German Dem. Rep. . |
| 53-58557 | 5/1978 | Japan . |
| 615080 | 6/1978 | U.S.S.R. . |
| 960180 | 9/1982 | U.S.S.R. . |
| 917831 | 2/1963 | United Kingdom . |

*Primary Examiner*—Mark D. Sweet
*Attorney, Agent, or Firm*—Martin Connaughton

[57] ABSTRACT

The transition metal-containing hydrophobic silica has a BET specific surface area of 40 to 450 m$^2$/g, a carbon content, obtained by the imparting of hydrophobic properties, of at least 0.5% by weight and a transition metal content of 10 to 10,000 ppm by weight. The hydrophobic silica is used as a heat stabilizer in addition-crosslinking 2-component silicone rubber materials.

7 Claims, No Drawings

1

TRANSITION METAL-CONTAINING HYDROPHOBIC SILICA

FIELD OF INVENTION

The present invention relates to transition metal-containing hydrophobic silica, its preparation and addition-crosslinking 2-component silicone rubber materials which contain this silica as a heat stabilizer.

BACKGROUND OF INVENTION

Metal compounds, such as metal salts, and organometallic compounds are known as heat stabilizers for addition-crosslinking 2-component silicone rubber materials. EP-A-231 519 describes the use of acetylacetonates of copper, zinc, aluminum, iron, cerium, zirconium and titanium. Such metal compounds are not very compatible with the hydrophobic silicone polymer and, owing to poor miscibility, are not homogeneously distributed in the silicone rubber materials. In particular, the chelates, such as the acetylacetonates, are better distributed in the silicone rubber materials but lead to inhibition of the platinum metal complexes and consequently to a lower vulcanization rate and poor crosslinking. Colored metal compounds cause coloration of the silicone rubbers. During vulcanization and under thermal stress, discoloration and opacity occur as a result of the formation of metal hydroxides and oxides, owing to inhomogeneity.

JP-A-53058557 discloses addition-crosslinking silicone rubber materials which have, as a heat stabilizer, ferrite containing oxides of other metals. The amounts of ferrite required for heat stabilization lead to colorations and poor transparency and cannot be incorporated together with the hydrophobic filler into the silicone rubber materials since the ferrite is obtained in coarser form.

U.S. Pat. No. 4,360,388 describes the use of cerium-containing hydro-philic precipitated silica for the heat stabilization of high-temperature vulcanizing silicone rubber. U.S. Pat. No. 4,164,509 describes the imparting of hydrophobic properties to pyrogenic silica by means of titanium tetrabutylate. However, the imparting of hydro-phobic properties is not permanent; in contact with hot water, the nonwettability with water is lost. The above metal-containing silicas are not actively reinforcing fillers and thus undesirably increase the filler load of the silicone rubber without helping to improve the mechanical properties. As hydrophobic fillers, they can lead to undesirable changes in the rheological properties of the silicone rubber. The metal-containing silicas must be homo-geneously distributed in the silicone polymer in an additional dispersing step in addition to the incorporation of the reinforcing silica filler. The use of these metal-containing silicas lead to discolorations and opacity in the silicone rubber.

SUMMARY OF INVENTION

It is the object of the present invention to provide a particularly effective heat stabilizer for addition-crosslinking 2-component silicone rubber materials, which stabilizer can be incorporated in the silicone rubber materials with as little effort as possible and leads neither to colorations nor to opacity of the silicone rubber.

The present invention relates to a hydrophobic silica having a specific BET surface area of 40 to 450 m²/g, a carbon content, obtained by the imparting of hydrophobic properties, of at least 0.5% by weight and a transition metal content of 10 to 10,000 ppm by weight.

The specific surface area of the silica is determined in the BET method by nitrogen adsorption according to ASTM Special Technical Publication No. 51, 1941, page 95 et seq. and DIN 66131/66132.

When used as a heat stabilizer in addition-crosslinking 2-component silicone rubber materials, the silica according to the invention has the following advantages over known heat stabilizers. The silica is a heat stabilizer and at the same time an actively reinforcing filler and can therefore be homogeneously mixed into the silicone rubber materials. The incorporation of the filler and of the heat stabilizer in the silicone rubber materials can therefore be carried out in one step. No additional metal compound is required as a heat stabilizer. Therefore, there are no additional solvents or solubilizers, no free and hence interfering oppositely charged ions, such as chloride or sulfate of the metal compound, and no complex-forming components introduced into the silicone rubber materials.

The effect of the same amount of a transition metal as heat stabilizer is increased compared with the separate use of a transition metal compound and hydrophobic silica and compared with hydrophilic transition metal-containing silica. Under thermal stress, the silicone rubber to which the silica has been added exhibits both less impairment of mechanical properties and a smaller loss of mass.

The absence of discolorations of the silica during the surface treatment of the very finely divided silica with a liquid or soluble transition metal compound while simultaneously imparting hydrophobic properties with an organosilicon compound is also unexpected. While the silicates of many metal compounds have an intense color or are black, and the surface treatment of silica with soluble or liquid metal compounds also leads to colored powders in many cases, the silicas according to the invention are white, powdery products which, after incorporation in the silicone rubber material, give substantially transparent and non-colored vulcanized products even after thermal stress over a relatively long period.

Cerium, iron, hafnium, copper, zinc, manganese, nickel, titanium and zirconium are preferred as transition metals on the silica. The combination of copper and zinc is also preferred.

The mean primary particle diameter of the silica is not more than 10 μm, preferably 5 to 50 nm.

The transition metal content of the silica is preferably 100 to 6,000 ppm by weight.

The carbon content of the silica is a measure of the coating of its surface with water repellant. It is preferably 1% to 10%, in particular 2% to 6% by weight.

The invention also relates to a process for the preparation of the silica in which a hydrophilic silica is mixed with (a) a liquid transition metal compound or a transition metal compound dissolved in water or in an organic solvent and (b) an organic or organosilicon water repellant.

The silica used is preferably pyrogenic or precipitated silica.

Examples of water-soluble transition metal compounds are the salts thereof, such as the sulfates, nitrates and halides, in particular the chlorides, and the acetates, formiates and oxalates. Preferred examples are cerium(III) nitrate, cerium(III) chloride, cerium(IV) sulfate, iron(II) sulfate, iron(II) oxalate, iron(III) nitrate, iron(III) chloride, hafnium(IV) oxychloride, copper(II) sulfate, copper(II) nitrate, copper(II) chloride, copper(II) acetate, manganese(II) sulfate, manganese(II) nitrate, manganese(II) chloride, manganese(II) acetate, nickel(II) chloride, nickel(II) nitrate, nickel(II) sulfate, nickel(II) acetate, titanium(III) chloride in 10% strength hydrochloric acid and zirconium(IV) oxychloride.

Examples of transition metal compounds which are soluble in organic solvents are the acetylacetonates thereof, in particular tris(acetylacetonato) iron(III), bis(acetylacetonato)manganese(II), diisopropoxybis(acetylacetonato)titanium(IV), tetrakis(acetylacetonato)titanium(IV), bis(acetylacetonato)titanium(IV) oxide and tetrakis(acetylacetonato) zirconium(IV).

Organic solvents or solvent mixtures having a boiling point or boiling range of up to 120° C. at 0.1 hPa are preferably used. Examples of such solvents are alcohols, such as methanol, ethanol, n-propanol and isopropanol; ethers, such as dioxane, tetrahydrofuran, diethyl ether and diethylene glycol dimethyl ether; chlorinated hydrocarbons, such as dichloromethane, trichloromethane, tetrachloromethane, 1,2-dichloroethane and trichloroethylene; hydrocarbons, such as pentane, n-hexane, hexane isomer mixtures, cyclohexane, heptane, octane, cleaner's naphtha, petroleum ether, benzene, toluene and xylenes; ketones, such as acetone, methyl ethyl ketone and methyl isobutyl ketone; inert organosilicon compounds, such as siloxanes, for example hexamethyldisiloxane; carbon disulfide and nitrobenzene, or mixtures of these solvents.

Transition metal compounds which are liquid at room temperature to 170° C. and may be used are, for example, the halogen compounds of titanium(IV), of zirconium(IV) and of hafnium(IV), in particular titanium(IV) chloride and zirconium(IV) chloride, and organometallic compounds, such as the alkyl alcoholates of titanium(IV), zirconium(IV) and hafnium(IV), in which the alkyl radicals of the alcohol have 1 to 8 C atoms. Examples are, in particular, tetraisopropoxy titanate, tetra-n-butoxy titanate, tetraisopropoxy zirconate and tetra-n-butoxy zirconate. The alcoholates of titanium(IV), zirconium(IV) and hafnium(IV) may optionally be diluted with inert solvents. Examples of such inert solvents are the alkyl alcohols corresponding to the particular alkyl alcoholates, such as isopropanol or n-butanol, and the above mentioned hydrocarbons and inert organosilicon compounds.

The surface treatment of the filler with the transition metal compound is carried out by thorough mixing of the two components. This may preferably be carried out at temperatures of 5° C. to not more than the boiling point of the solvent used or of the liquid transition metal compound used, which may boil at a lower temperature. The coating is effected in general at atmospheric pressure and in a period of 30 seconds to 24 hours, in particular 5 minutes to 120 minutes.

The silica is preferably rendered hydrophobic with an organosilicon compound. The organosilicon compound used is preferably one of the formula

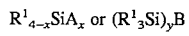

$R^1_{4-x}SiA_x$ or $(R^1_3Si)_yB$ in which
R$^1$ is identical or different and are each a monovalent, optionally halogen-substituted hydrocarbon radicals having 1 to 18 carbon atoms per radical,
A is halogen, —OH, —OR$^2$ or —OCOR$^2$,
B is $NR^{3-y}_3$,
R$^2$ is a monovalent hydrocarbon radical having 1 to 12 carbon atoms per radical,
R$^3$ is a hydrogen atom or has the same meaning as R$^1$,
x is 1, 2 or 3 and
y is 1 or 2,
or organo(poly)siloxanes consisting of units of the formula

$R^1_z SiO_{(4-z)/2}$ in which
R$^1$ has the above mentioned meaning and
z is 1, 2 or 3.

Examples of radicals R$^1$ are alkyl radicals, such as the methyl, ethyl, n-propyl, isopropyl, n-butyl, isobutyl, tert.-butyl, n-pentyl, isopentyl, neopentyl or tert-pentyl radical; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals, such as the vinyl and the allyl radical; cycloalkyl radicals, such as cyclopentyl, cyclohexyl and cycloheptyl radicals and methylcyclohexyl radicals; aryl radicals, such as the phenyl, naphthyl and anthryl and phenanthryl radical; alkaryl radicals, such as o-, m- and p-tolyl radicals, xylyl radicals and ethylphenyl radicals; and aralkyl radicals, such as the benzyl radical, the α- and the β-phenylethyl radical. Examples of halogen-substituted hydrocarbon radicals are alkyl radicals substituted by fluorine, chlorine and bromine atoms, such as the 3,3,3-trifluoro-n-propyl radical, the 2,2,2,2',2',2'-hexafluoroisopropyl radical, the heptafluoroisopropyl radical and the perfluorohexylethyl radical. A preferred example of R$^1$ is the methyl radical.

Examples of radicals R$^2$ are alkyl radicals, such as the methyl, ethyl, n-propyl, isopropyl, n-butyl, isobutyl, tert-butyl n-pentyl, isopentyl, neopentyl and tert-pentyl radical; hexyl radicals, such as the n-hexyl radical; heptyl radicals, such as the n-heptyl radical; octyl radicals, such as the n-octyl radical and isooctyl radicals, such as the 2,2,4-trimethylpentyl radical; nonyl radicals, such as the n-nonyl radical; decyl radicals, such as the n-decyl radical; dodecyl radicals, such as the n-dodecyl radical; aryl radicals, such as the phenyl radical; alkaryl radicals, such as the o-, m- and p-tolyl radicals, and aralkyl radicals, such as the benzyl radical. Preferred examples of R$^2$ are the methyl and ethyl radical.

Examples of organosilicon compounds are alkylchlorosilanes, such as methyltrichlorosilane, dimethyldichlorosilane, trimethylchlorosilane, octyltrichlorosilane, octadecyltrichlorosilane, octylmethyldichlorosilane, octadecylmethyldichlorosilane, octyldimethylchlorosilane, octadecyldimethylchlorosilane and tert-butyldimethylchlorosilane; alkylalkoxysilanes, such as dimethyldimethoxysilane, dimethyldiethoxysilane, trimethylmethoxysilane and trimethylethoxysilane; trimethylsilanol; cyclic diorgano(poly)siloxanes, such as cyclic dimethyl(poly)siloxanes and linear diorganopolysiloxanes, such as dimethylpolysiloxanes terminated by trimethylsiloxy groups and dimethylpolysiloxanes having terminal hydroxyl or alkoxy groups; disilazanes, such as hexaalkyldisilazane, in particular hexamethyldisilazane, divinyltetramethyldisilazane, bis(trifluoropropyl)tetramethyldisilazane and cyclic dimethylsilazanes, such as cyclohexamethyltrisilazane.

Particularly useful water repellants are low molecular weight cyclosiloxanes, such as octamethylcyclotetrasiloxane, short-chain SiOH-terminated dimethylpolysiloxanes having a chain length in the range from 2 to 20, silazanes, such as hexamethyldisilazane and 1,3-divinyl-1,1,3,3-tetramethyldisilazane, and chlorosilanes, such as dimethyldichlorosilane.

Mixtures of different organosilicon compounds may also be used.

The surface treatment of the silica with the organosilicon compound is carried out in the same step as the surface treatment with the transition metal compound or in a second subsequent step by thorough mixing of the components and can be carried out at temperatures of 5° C. to 350° C., in particular at 15° C. to 200° C. The procedure for imparting hydrophobic properties is carried out in general at atmospheric pressure and in a period of 30 seconds to 24 hours, preferably 5 minutes to 120 minutes.

The surface treatment of the silica with the organosilicon compound and the transition metal compound can be carried out by introducing the liquid or dissolved components dropwise or in very finely divided form into the silica powder which is fluidized or kept in motion by stirring, or by the addition of the organosilicon compound and of the transition metal compound to a stationary or agitated and stirred suspension of the silica. All inert organic solvents, in particular the above mentioned, aliphatic and aromatic hydrocarbons, and organosilicon compounds which are liquid at treatment temperature, may be used as solvents for suspending.

The step comprising coating with metal compound and organosilicon compound can be followed directly or after reaction phase of preferably 30 seconds to 24 hours, in particular 5 minutes to 60 minutes, at preferably 5° C. to 150° C., in particular 30° C. to 90° C., by a heating process at 100° C. to 450° C., in particular 150° C. to 300° C., with a duration of heating process of 1 minute to 12 hours, preferably 10 minutes to 3 hours.

Both coating and heating can be carried out both continuously and batchwise.

The invention also relates to addition-crosslinking 2-component silicone rubber materials which contain the silica as a heat stabilizer.

The silicone rubber materials according to the invention consist of the constituents:
(I) silica according to the invention
(II) polyorganosiloxane having at least two alkenyl groups per molecule,
(III) polyorganosiloxane having at least two SiH groups per molecule and
(IV) hydrosilylation catalyst.

The 2-components of the silicone rubber materials according to the invention may contain the constituents I to IV and optionally further additives in any combination and ratio, with the proviso that a component does not simultaneously contain the constituents II, III and IV.

Constituent (II) of the silicone rubber materials according to the invention is a polyorganosiloxane which contains at least two alkenyl groups per molecule and having a viscosity at 25° C. in the range from 0.1 to 1,000 Pa•s, preferably from 1 to 100 Pa•s.

The polyorganosiloxane (II) is composed of units of the formula $$R_a^4 R_b^5 SiO_{(4-a-b)/2}$$

in which
a is 0, 1 or 2 and
b is 0, 1, 2 or 3,
with the proviso that at least two radicals $R^4$ are present in each molecule and the sum (a+b) is <4.

$R^4$ represents an alkenyl group. The alkenyl groups chosen may be all alkenyl groups capable of undergoing a hydrosilylation reaction with a crosslinking agent having SiH functional groups. Alkenyl groups having 2 to 6 carbon atoms, such as vinyl, allyl, methallyl, 1-propenyl, 5-hexenyl, ethenyl, butadienyl, hexadienyl, cyclopentenyl, cyclopentadienyl and cyclohexenyl, preferably vinyl and allyl, are used.

$R^5$ represents a substituted or unsubstituted, aliphatic saturated, monovalent hydrocarbon radical having 1 to 10 carbon atoms, preferably 1 to 6 carbon atoms. Examples of these are the alkyl groups, such as methyl, ethyl, propyl, butyl and hexyl, cycloalkyl groups, such as cyclopentyl, cyclohexyl and cycloheptyl, aryl and alkaryl groups, such as phenyl, tolyl, xylyl, mesityl, benzyl, beta-phenylethyl and naphthyl, or halogen-substituted groups, such as 3,3,3-trifluoropropyl, o-, p- and m-chlorophenyl, bromotolyl and beta-cyanoethyl.

The alkenyl groups may be bonded in any position of the polymer chain, in particular at the terminal silicon atoms.

Constituent (II) may also be a mixture of different polyorganosiloxanes which contain alkenyl groups and differ in the alkenyl group content, the type of alkenyl group or structurally.

The structure of the polyorganosiloxanes which contain alkenyl groups may be linear, cyclic or branched. In addition to monofunctional units, such as $R^4R_2^5SiO_{1/2}$ and $R_3^5 SiO_{1/2}$, and difunctional units, such as $R_2^5SiO_{2/2}$ and $R^4R^5SiO_{2/2}$, branched polyorganosiloxanes also contain trifunctional units, such as $R^5SiO_{3/2}$ and $R^4SiO_{3/2}$, and/or tetrafunctional units of the formula $SiO_{4/2}$, in which $R^4$ and $R^5$ have the above mentioned meaning. The content of these tri- and/or tetrafunctional units leading to branched polyorganosiloxanes, which is typically very small, i.e., less than 0.1 mole % should not substantially exceed 20 mole %. The polyorganosiloxane which contains alkenyl groups may also contain units of the general formula $$-OSi(R^6R^7)R^8Si(R^6R^7)O-,$$

in which both $R^6$ and $R^7$ have the meaning stated above for $R^4$ and $R^5$, and $R^8$ designates a divalent organic radical, such as ethylene, propylene, phenylene, diphenylene or polyoxymethylene. Such units may be present in an amount of up to 50 mole % in the constituent (II).

The use of polydimethylsiloxanes which contain vinyl groups and whose molecules correspond to the formula $$(ViMe_2SiO_{1/2})_2(ViMe\ SiO)_a(Me_2SiO)_b$$

in which a and b are non-negative numbers and fulfil the following relations: a+1>0, 50<(a+b)<2200, preferably 200<(a+b)<1000, and 0<(a+1)/(a+b)<0.2, is more preferred.

Constituent (III) of the silicone rubber material according to the invention is a polyorganosiloxane which has SiH functional groups and is composed of units of the following formula $$H_cR_d^5SiO_{(4-c-d)/2},$$

in which
c is 0, 1 or 2 and
d is 0, 1, 2 or 3,
with the proviso that the sum (c+d) is <4 and that at least two silicon-bonded hydrogen atoms are present per molecule.

The use of a polyorganosiloxane which contains three or more SiH bonds per molecule is preferred. When a constitutent (III) having only two SiH bonds per molecule is used, the polyorganosiloxane (II) which contains alkenyl groups preferably contains at least three alkenyl groups per molecule.

The polyorganosiloxane (III) is used as a crosslinking agent. The hydrogen content of the crosslinking agent, which relates exclusively to the hydrogen atoms bonded directly to silicon atoms, is in the range from 0.002% to 1.7% by weight of hydrogen, preferably between 0.1% and 1.7% by weight of hydrogen.

The polyorganosiloxane (III) preferably contains at least three, and preferably not more than 600, silicon atoms per molecule. The use of SiH crosslinking agents which contain between 4 and 200 silicon atoms per molecule is more preferred.

The structure of the polyorganosiloxane (III) may be linear, branched, cyclic or network-like. Linear and cyclic polyorganosiloxanes (III) are composed of units of the formula $HR_2^5SiO_{1/2}$, $R_3^5SiO_{1/2}$, $HR^5SiO_{2/2}$ and $R_2^5SiO_{2/2}$, in which $R^5$ has the above mentioned meaning. Branched and network-like polyorganosiloxanes (III) additionally contain trifunctional units, such as $HSiO_{3/2}$ and $R^5SiO_{3/2}$, and/or tetrafunctional units of the formula $SiO_{4/2}$. With increasing content of tri- and/or tetrafunctional units, these crosslinking agents have a network-like, resin-like structure. The organic radicals $R^5$ present in the polyorganosiloxane (III) are usually chosen so that they are compatible with the organic radicals present in the constituent (II) and the constituents (II) and (III) are therefore miscible.

Combinations and mixtures of the polyorganosiloxanes (III) described can also be used as crosslinking agents.

Particularly preferred polyorganosiloxanes (III) have the formula

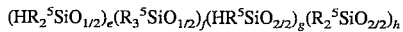

in which the non-negative integers e, f, g and h fulfil the following relations: $(e+f)=2$, $(e+g)>2$, $5<(g+h)>200$ and $0.1>g/(g+h)\leq 1$.

The polyorganosiloxane (III) is preferably present in the curable silicone rubber material in an amount such that the molar ratio of SiH groups to alkenyl groups is between 0.5 and 5, preferably between 1.0 and 3.0.

Constituent (IV) serves as a catalyst for the additional reaction (hydrosilylation) between the alkenyl groups of the constituent (II) and the silicon-bonded hydrogen atoms of the constituent (III). Many suitable hydrosilylation catalysts have been described in the literature. In principle, all hydrosilylation catalysts usually employed in addition-crosslinking silicone rubber materials can be used.

Metals, such as platinum, rhodium, palladium, ruthenium and iridium, preferably platinum, which are optionally supported on finely divided carrier materials, such as active carbon, alumina or silica, can be used as a hydrosilylation catalyst.

Platinum and platinum compounds are preferably used. Particularly preferred platinum compounds are those which are soluble in polyorganosiloxanes. Soluble platinum compounds which may be used are, for example, the platinum-olefin complexes of the formulae $(PtCl_2 \cdot olefin)_2$ and $H(PtCl_3 \cdot olefin)$, alkenes having 2 to 8 carbon atoms, such as ethylene, propylene and isomers of butene and of octene, or cycloalkenes having 5 to 7 carbon atoms, such as cyclopentene, cyclohexene and cycloheptene, being preferably used. Further soluble platinum catalysts are the platinum-cyclopropane complex of the formula $(PtCl_2 \cdot C_3H_6)_2$, the reaction products of hexachloroplatinic acid with alcohols, ethers and aldehydes or mixtures thereof or the reaction product of hexachloroplatinic acid with methylvinylcyclotetrasiloxane in the presence of sodium bicarbonate in ethanolic solution. Complexes of platinum with vinylsiloxanes, such as sym-divinyltetramethyldisiloxane, are more preferred.

The hydrosilylation catalyst may also be used in microencapsulated form, the finely divided solid which contains the catalyst and is insoluble in the polyorganosiloxane being, for example, a thermoplastic (polyester resins, silicone resins). The hydrosilylation catalyst may also be used in the form of an inclusion compound, for example in a cyclodextrin.

The amount of the hydrosilylation catalyst used depends on the desired crosslinking rate and on economic aspects. When conventional platinum catalysts are used, the platinum metal content is preferably in the range from 0.1 to 500 ppm by weight, preferably between 10 and 100 ppm by weight, relative to the curable silicone rubber material.

While constituents (I) to (IV) are essential constituents of the silicone rubber material further additives in an amount of up to 50% by weight, preferably between 1% and 20% by weight, can be present in the silicone rubber material. These additives may be fillers, dispersants, adhesion promoters, inhibitors, pigments, dyes, plasticizers, etc.

Examples of fillers are reinforcing fillers, i.e., fillers having a BET specific surface area of at least 50 $m^2/g$, preferably 50–500 $m^2/g$, such as pyrogenically produced silica, e.g., so-called fumed-silica, silica hydrogels dehydrated with retention of the structure, i.e., so-called "aerogels", and other types of precipitated silica; and non-reinforcing fillers, i.e., fillers having a BET specific surface area of less than 50 $m^2/g$, such as quartz powder, kieselguhr, calcium silicate, zirconium silicate, zeolites, iron oxide, zinc oxide, titanium dioxide, alumina, calcium carbonate, magnesium carbonate, zinc carbonate, carbon black, mica and chalk. The stated fillers may have been rendered hydrophobic by treatment with the above mentioned water repellants.

Examples of plasticizers are diorganopolysiloxanes which are liquid at room temperature and terminated by triorganosilyloxy groups, such as dimethylpolysiloxanes terminated by trimethylsilyloxy groups and having a viscosity of 10 to 10,000 mPa·s at 25° C.

These include additives such as quartz powder, kieselguhr, clays, chalk, lithopone, carbon blacks, graphite, metal oxides, metal carbonates, metal sulfates, metal dusts, fibers, dyes, pigments, etc.

In particular, resin-like polyorganosiloxanes which essentially consist of units of the formulae $R_3^5SiO_{1/2}$, $R^5SiO_{3/2}$ and/or $SiO_{4/2}$, optionally also $R_2^5SiO_{2/2}$, may be present in an amount of up to 50% by weight, preferably up to 20% by weight, relative to the total weight of the silicone rubber. The molar ratio of monofunctional to tri- or tetrafunctional units of these resin-like polyorganosiloxanes is preferably in the range from 0.5: 1 to 1.5:1. Functional groups, in particular alkenyl groups, in the form of $R^4R_2^5SiO_{1/2}$ and/or $R^4R^5SiO_{2/2}$ units, may also be present.

In particular, additives which serve for controlling the processing time and crosslinking rate of the curable silicone rubber material may be present. Known inhibitors and stabilizers are, for example, acetylenic alcohols, such as ethynylcyclohexanol and 2-methyl-3-butyn-2-ol, polymethylvinylcyclosiloxanes, such as methylvinylcyclotetrasiloxane, low molecular weight siloxane oils having vinyldimethylsilyloxy terminal groups, trialkyl cyanurates, alkyl maleates, such as diallyl maleate and dimethyl maleate, alkyl fumarates, such as diethyl fumarate and diallyl fumarate, organic hydroperoxides, such as cumyl hydroperoxide, tert-butyl hydroperoxide and pinane hydroperoxide, organic peroxides, benzotriazole, organic sulfoxides, organic amines and amides, phosphines, phosphites, nitriles, diaziridines and oximes. The preparation of the silicone rubber materials according to the invention is preferably carried out by mixing the filler, in a first step, with the polyorganosiloxane (II) which contains alkenyl groups to give a uniform mixture. The filler is incorporated in the polyorganosiloxane in a suitable mixer, for example a kneader.

Depending on the water repellant character of the filler (hydrophobic or hydrophilic), a distinction can be made between two methods of filler incorporation.

Method A

Hydrophobic fillers, such as the silica according to the invention, can be mixed directly, i.e., without further additives, with the polyorganosiloxane (II) which contains alkenyl groups. Elevated temperatures and as high a filler content as possible during the mixing have an advantageous effect on the dispersing rate and quality of dispersion of the filler in the polyorganosiloxane (II). For this reason, the filler is mixed into the polyorganosiloxane (II) preferably at a temperature in the range from 100° C. to 200° C., in particular from 140° C. to 160° C. Advantageously, a highly viscous mixture is first prepared by gradually mixing the filler with a suitable portion of the polyorganosiloxane (II), and, by the use of sufficiently high shear forces, said mixture permits optimum destructuring and dispersing of the filler. The highly viscous mixture is generally sheared for 0.5 to 5 hours at the above temperatures, optionally in vacuo. The duration of the mixing process is dependent on, inter alia, the amount, the viscosity and the shearing parameters. The desired filler content is then established by addition of the remaining amount of polyorganosiloxane and thorough mixing. The filler content is in the range from 10% to 50% by weight. The viscosity of the homogeneous filler-containing polyorganosiloxane material prepared in this manner is typically 0.5 to 5,000 Pa•s at a filler content of about 30% by weight and at a temperature of 25° C.

Method B

Hydrophilic fillers are mixed with the polyorganosiloxane which contains alkenyl groups, in the presence of a suitable water repellant. Suitable water repellants are described above. The organic radicals present in the water repellant are advantageously chosen so that they are substantially compatible with the organic radicals present in constituent (II), which facilitates optimum dispersing of the filler in the polyorganosiloxane. By adding small amounts of water, the process of imparting hydrophobic properties can be accelerated.

100 parts by weight of polyorganosiloxane can be mixed with 1 to 100 parts by weight of filler, preferably with 30 to 80 parts by weight of filler. The amount of water repellant to be used depends, inter alia, on the type of water repellant, the filler content of the mixture and the silanol group content of the filler. When hexamethyldisilazane is used, the amount to be employed is in the range from 1% to 20% by weight, preferably from 5% to 10% by weight, relative to the filler/polyorganosiloxane mixture. Water may be added in an amount of 5% to 100% by weight, relative to the amount of water repellant, for accelerating the reaction. By-products formed, such as ammonia, alcohols and hexamethyldisiloxane, and other volatile constituents, such as water and low molecular weight organosiloxanes are removed after hydrophobic properties have been imparted to the filler in situ by heat treatment of the mixture at a temperature in the range from 120° C. to 200° C. for 2 to 8 hours, preferably in the range from 130° C. to 160° C. for 3 to 5 hours, advantageously in vacuo and with continuous kneading.

A homogeneous, filler-containing material whose viscosity at 25° C. is typically between 0.5 and 5,000 Pa•s at a filler content of about 30% by weight is obtained.

In a second step, two-components A and B are prepared by mixing a crosslinking agent having SiH functional groups, as constituent II, a hydrosilylation catalyst and optionally other additives into the filler-containing polyorganosiloxane materials prepared by Methods (A) or (B), it being possible for each of the components to contain all or some of the constituents (I) to (IV) and optionally additives, with the proviso that no component simultaneously contains the constituents II, III and IV. Separation into a component containing the crosslinking agent having SiH functional groups and a component containing the hydrosilylation catalyst is expedient and preferred, so that curing of the material to give a silicone rubber can take place only after mixing of said components.

The silicone rubber materials are particularly suitable for the production of silicone rubber articles which are resistant to high temperatures, such as seals, sealing materials, electrical insulation materials, conveyor belts subjected to high temperatures, roller coverings, hoses, films, etc.

In the Examples described below, all stated viscosities relate to a temperature of 25° C. Unless stated othewise, the Examples below are carried out at a pressure of the surrounding atmosphere, i.e., at about 1,000 hPa, and at room temperature, i.e., at about 20° C., or at a temperature which results when the reactants are combined at room temperature without additional heating or cooling. Furthermore, all stated parts and percentages are by weight, unless stated otherwise.

Moreover, the following abbreviations are used:
Me: Methyl radical
Et: Ethyl radical
h: hour
d: day.

EXAMPLE 1

Preparation of the Transition Metal-Containing Silica

The transition metal-containing hydrophobic silicas according to the invention are indicated by an "*".

A. 10 g of an aqueous 0.1 N hydrochloric acid containing 24.2 g/kg of iron(III) chloride hexahydrate were mixed, at 25° C., with 100 g of a fumed silica having a BET specific surface area of 300 m$^2$/g (obtainable from Wacker-Chemie GmbH as Wacker HDK® T30). After homogenization for 30 minutes at 25° C. and heating for 2 hours at atmospheric pressure under a stream of nitrogen at 300° C., a reddish brown powder was obtained.

B*. 10 g of an aqueous 0.1 N hydrochloric acid containing 24.2 g/kg of iron(III) chloride hexahydrate and subsequently 45 g of hexamethyldisilazane were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 150° C. and heating for 2 hours at atmospheric pressure under a stream of nitrogen at 300° C., a white powder was obtained.

C. 10 g of an aqueous 0.1 N hydrochloric acid containing 242 g/kg of iron(III) chloride hexahydrate were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 2 hours at atmospheric pressure under a stream of nitrogen at 300° C., a reddish brown powder was obtained.

D*. 10 g of an aqueous 0.1 N hydrochloric acid containing 242 g/kg of iron(III) chloride hexahydrate and subsequently 45 g of hexamethyldisilazane were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 150° C. and heating for 2 hours at atmospheric pressure under a stream of nitrogen at 300° C., a substantially white powder was obtained.

E*. 10 g of an aqueous 0.01 N hydrochloric acid containing 4.8 g/kg of iron(III) chloride hexahydrate and subsequently 16.2 g of dimethyldichlorosilane were mixed, at 25° C., with 100 g of a fumed silica having a BET specific surface area of 200 m$^2$/g (obtainable from Wacker as Wacker HDK® N20). After homogenization for 15 minutes at 25° C. and heating for 1 hour at atmospheric pressure under a stream of nitrogen at 250° C., a white powder was obtained.

F. 10 g of an aqueous 0.1 N hydrochloric acid containing 13.4 g/kg of copper (II) chloride dihydrate were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 2 hours at atmospheric pressure under a stream of nitrogen at 300° C., a pale bluish powder was obtained.

G*. 10 g of an aqueous 0.1 N hydrochloric acid containing 13.4 g/kg of copper (II) chloride dihydrate and subsequently 45 g of hexamethyldisilazane were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 150° C. and heating for 2 hours at atmospheric pressure under a stream of nitrogen at 300° C., a white powder was obtained.

H. 10 g of an aqueous 0.1 N solution of 13.3 g/kg of cerium (III) chloride heptahydrate were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 200° C. and heating for 2 hours at atmospheric pressure under a stream of nitrogen at 200° C., a white powder having a slightly yellowish tinge was obtained.

I*. 10 g of an aqueous 0.1 N solution of 13.3 g/kg of cerium (III) chloride heptahydrate and subsequently 45 g of hexamethyldisilazane were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 150° C. and heating for 1 hour at atmospheric pressure under a stream of nitrogen at 200° C., a white powder was obtained.

J. 10 g of an aqueous 0.1 N hydrochloric acid containing 18.0 g/kg of manganese(II) chloride tetrahydrate were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 2 hours at atmospheric pressure under a stream of nitrogen at 250° C. a brownish powder was obtained.

K*. 10 g of an aqueous 0.1 N hydrochloric acid containing 18.0 g/kg of manganese(II) chloride tetrahydrate and subsequently 45 g of hexamethyldisilazane were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 250° C. a substantially white powder was obtained.

L. 10 g of an aqueous 0.1 N hydrochloric acid containing 20.2 g/kg of nickel(II) chloride hexahydrate were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 2 hours at atmospheric pressure under a stream of nitrogen at 250° C. a white powder having a slightly greenish tinge was obtained.

M*. 10 g of an aqueous 0.1 N hydrochloric acid containing 20.2 g/kg of nickel(II) chloride hexahydrate and subsequently 45 g of hexamethyldisilazane were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 150° C. and heating for 2 hours at atmospheric pressure under a stream of nitrogen at 250° C., a white powder was obtained.

N. 10 g of a solution of 35.5 g/l of tetra-n-butoxy-titanium(IV) in hexamethyldisiloxane were mixed, at 25° C., with 100 g of fumed silica having a BET specific surface area of 300 m2/g (obtainable from Wacker-Chemie GmbH as Wacker HDK® T30). After homogenization for 30 minutes at 25° C. and heating for 1 hour at atmospheric pressure under a stream of nitrogen at 150° C. and heating for 2 hours at atmospheric pressure under a stream of nitrogen at 250° C., a white powder was obtained.

O*. 10 g of a solution of 35.5 g/l of tetra-n-butoxy-titanium(IV) in hexamethyldisiloxane and subsequently 45 g of hexamethyldisilazane were mixed, at 25° C., with 100 g of fumed silica having a BET specific surface area of 300 m$^2$/g (obtainable from Wacker-Chemie GmbH as Wacker HDK® T30). After homogenization for 30 minutes at 25° C. and heating for 1 hour at atmospheric pressure under a stream of nitrogen at 150° C. and heating for 2 hours at atmospheric pressure under a stream of nitrogen at 250° C., a white powder was obtained.

P*. 7.67 g of an aqueous solution of 15.1 g/kg of cerium(III) chloride heptahydrate and subsequently 22.5 g of hexamethyldisilazane were mixed, at 25° C., with 150 g of a fumed silica having a BET specific surface area of 300 m$^2$/g (obtainable from Wacker-Chemie GmbH as Wacker HDK® T30P), suspended in 1,000 g of hexamethyldisiloxane, while stirring. After stirring had been carried out for 120 minutes at 60° C., the solvent had been stripped off in a rotary evaporator at 60° C. and a pressure down to less than 15 hPa and the mixture had been heated for 2 hours at atmospheric pressure under a stream of nitrogen at 150° C., a white powder was obtained.

Q. 7.77 g of an aqueous solution of 26.5 g/kg of cerium(III) chloride heptahydrate were mixed with 150 g of a fumed silica having a BET specific surface area of 300 m$^2$/g (obtainable from Wacker-Chemie GmbH as Wacker HDK® T30P), suspended in 1,000 g of hexamethyldisiloxane, while stirring. After stirring had been carried out for 120 minutes at 60° C., the solvent had been stripped off in a rotary evaporator at 60° C. and a pressure down to less than 15 hPa and the mixture had been heated for 2 hours at atmospheric pressure under a stream of nitrogen at 150° C., a slightly yellowish powder was obtained.

R*. 7.77 g of an aqueous solution of 26.5 g/kg of cerium(III) chloride heptahydrate and subsequently 22.5 g of hexamethyldisilazane were mixed at 25° C., with 150 g of a fumed silica having a BET specific surface area of 300 m²/g (obtainable from Wacker-Chemie GmbH as Wacker HDK® T30P), suspended in 1,000 g of hexamethyldisiloxane, while stirring. After stirring had been carried out for 120 minutes at 60° C., the solvent had been stripped off in a rotary evaporator at 60° C. and a pressure down to less than 15 hPa and the mixture had been heated for 2 hours at atmospheric pressure under a stream of nitrogen at 150° C., a white powder was obtained.

TABLE I

Analytical data for the transition metal-containing fillers A to R*

| Sample | Carbon content % by weight) | Wettability with water[1] | Wettability with water after 48 hours in water at 100° C.[2] | Metal content | Color |
|---|---|---|---|---|---|
| A | 0.01 | yes | yes | 490 ppm Fe | red-brown |
| B* | 3.5 | no | no | 460 ppm Fe | white |
| C | 0.01 | yes | yes | 5000 ppm Fe | red-brown |
| D* | 3.5 | no | no | 4700 ppm Fe | white |
| E* | 5.5 | no | | | |
| K* | 3.6 | no | no | 410 ppm Mn | white |
| L | 0.01 | yes | yes | 470 ppm Ni | white-greenish |
| M* | 3.8 | no | no | 450 ppm Ni | white |
| N | 0.33 | yes | yes | 420 ppm Ti | white |
| O* | 3.9 | no | no | 410 ppm Ti | white |
| P* | 3.9 | no | no | 250 ppm Ce | white |
| Q | 0.01 | yes | yes | 450 ppm Ce | yellowish-white |
| R* | 3.9 | no | no | 420 ppm Ce | white |

[1] The filler is not wettable with water: Thorough shaking of the filler with an equal number of parts by volume of water in a test tube; the lower aqueous phase remains completely clear. Wettability of the filler with water: Thorough shaking of the filler with an equal number of parts by volume of water in a test tube; the lower aqueous phase becomes cloudy.
[2] The filler is not wettable with water after 48 hours in water at 100° C.: Heated 1 liter flask having a reflux condenser, ½ filled with water, covered with a layer of filler extending over ¼ of its height, thorough stirring of the boiling water; the lower aqueous phase remains completely clear even after 48 hours. Wettability of the filler with water after 48 hours in water at 100° C.: Heated 1 liter flask having a reflux condenser, ½ filled with water, covered with a layer of filler extending over ¼ of its height, thorough stirring of the boiling water; the lower aqueous phase becomes cloudy after 48 hours.

EXAMPLE 2

Preparation of the Curable Silicone Rubber Materials

A. Preparation of the Curable Silicone Rubber Material According to the Invention Using a Hydrophobic Filler 230 parts by weight of a vinyldimethylsilyloxy-terminated polydimethylsiloxane which has a viscosity of 20 Pa•s at 25° C. were mixed, in the course of 1 hour in a kneader, with 160 parts by weight of hydrophobic filler, which was added in portions and mixed in, to give a homogenous material. This material was then kneaded for 2 hours at 150° C. in vacuo (<100 hPa). After this heating phase, a further 150 parts by weight of the polyorganosiloxane having vinyl functional groups were mixed in and the material was homogenized in the course of 1 hour. A homogeneous polyorganosiloxane material which contained about 30% by weight of filler and whose viscosity was in the range from 500 to 1,500 Pa•s at 25° C. was obtained.

B. Preparation of a Curable Silicone Rubber Material Not According to the Invention, Using a Hydrophilic Filler 460 parts by weight of a vinyldimethylsilyloxy-terminated polyorganosiloxane which has a viscosity of 20 Pa•s at 25° C. were mixed, at room temperature in the course of 1.5 hours in a kneader, with 80 parts by weight of hexamethyldisilazane, 30 parts by weight of water and 280 parts by weight of hydrophilic filler, which was added in portions and mixed in, to give a homogeneous material. In order to remove volatile constituents and by-products, the mixture was then kneaded for 2 hours at 150° C. in vacuo (<100 hPa). After this heating phase, a further 200 parts by weight of the polyorganosiloxane having vinyl functional groups were mixed in, in portions, and the material was homogenized in the course of 1 hour. A homogeneous polyorganosiloxane material which contained about 30% by weight of filler and whose viscosity was in the range from 500 to 1,500 Pa•s at 25° C. was obtained.

C. Preparation of a Curable Silicone Rubber Material not According to the Invention, Using a Hydrophilic Metal-Free Silica For the purpose of comparison, a metal-free, hydrophilic, pyrogenic silica having a BET specific surface area of 300 m²/g (obtainable from Wacker as Wacker^R HDK T30) was mixed, by Method B), into a polydimethylsiloxane which has terminal dimethylvinylsilyloxy groups and a viscosity of 20 Pa•s at a temperature of 25° C., and the mixture was further processed, in the same way as the curable silicone rubber materials prepared using metal-containing silicas, to give crosslinked silicone rubber samples.

In order to ensure comparability of the filler-containing polyorganosiloxane materials prepared by Methods A, B and C, in particular the same content of silica as filler, the fact that considerable amounts of hydrophobic constituents are applied to the surface of the filler when imparting hydrophobic properties to hydrophilic fillers was taken into account. When hexamethyldisilazane is used, the groups are essentially trimethylsilyl groups. Assuming a carbon content of the hydrophobic filler of about 4% by weight (cf. Table I), the hydrophobic filler consequently contains only about 92% by weight of SiO₂, while the remaining 8% by weight correspond to the hydrophobic surface layer. It was assumed that a comparable hydrophobic surface layer which accounts for about 8% by weight of the hydrophobic filler remains on the filler, even in the case of an imparting of hydrophobic properties to the filler according to Method B. When this state of affairs is taken into account, the mixtures prepared by Methods A, B and C correspond both with regard to their filler content, relative to SiO₂, and in the metal content (for a given metal) within the given error limits.

For the preparation of the A component of the curable silicone rubber material, 100 parts by weight of the siloxane material containing as a filler, 100 parts by weight of silica prepared by Method A, B or C were mixed with 0.2 part by weight of a solution of platinum catalyst containing 1% by weight of platinum (solution of a platinum-sym-divinyltetramethyldisiloxane complex in a polydimethylsiloxane which has terminal dimethylvinylsilyloxy groups and a viscosity of 1,000 mPa•s at 25° C.; obtainable from Wacker as catalyst OL) and 0.1 part by weight of the inhibitor ethynylcyclohexanol to give a homogeneous material.

For the preparation of the B component of the curable silicone rubber material, 100 parts by weight of the filler-containing siloxane material prepared by Method A, B and C were mixed with 3.5 parts by weight of a copolymer of dimethylsilyloxy units, methylhydrogensilyloxy units and trimethylsilyloxy units, having a viscosity of 320 mPa·s at 25° C., and 0.48% by weight of Si-bonded hydrogen.

Preparation of the Crosslinked Silicone Rubbers

The preparation of the crosslinked silicone rubbers is carried out by thoroughly mixing A and B components in a weight ratio of 1:1 in a roll mill at a roll temperature of 25° C. for 15 minutes. This mixture was then crosslinked in a hydraulic press at a temperature of 170° C. for 15 minutes to give the silicone rubber. The silicone rubber sheets removed from the mold, which were about 2 mm or 6 mm thick, were heated for 4 hours at 200° C. in a so-called forced-draught drying oven.

Mechanical Properties of the Silicone Rubbers Before and After Heat Treatment

The thermal stability of the silicone rubbers prepared from the silicone rubber material using the metal-containing, pyrogenic silicas prepared by Methods A. to R. was evaluated on the basis of the following criteria:

a. Mechanical elastomer properties, such as Shore A hardness (according to DIN 53 505), tensile strength (according to DIN 53 504-S1) and elongation at break (according to DIN 53 504-S1), before and after thermal treatment of the silicone rubber samples by open storage for 50 hours at a temperature of 250° C. in a forced-draught oven. The different mechanical properties of the silicone rubber samples prepared using hydrophilic or hydrophobic metal-containing silicas A. to R* are shown in Table II. In particular, it is evident that the mechanical properties of the silicone rubbers pre- pared using hydrophobic, metal-containing silicas show a higher thermal stability (cf. Table II).

TABLE II

Mechanical elastomer properties before and after thermal treatment

| | Before thermal treatment | | | After thermal treatment | | |
|---|---|---|---|---|---|---|
| Silica | Shore A | Tensile strength (N/mm²) | Elongation at break (%) | Shore A | Tensile strength (N/mm²) | Elongation at break (%) |
| without addition | 40 | 8.3 | 610 | 54 | 3.1 | 90 |
| A | 42 | 8.1 | 550 | 46 | 3.6 | 110 |
| B* | 43 | 8.4 | 560 | 47 | 6.3 | 180 |
| F | 45 | 7.6 | 520 | 45 | 3.8 | 200 |
| G* | 43 | 7.3 | 540 | 42 | 5.4 | 250 |
| H | 41 | 9.3 | 620 | 47 | 7.1 | 240 |
| I* | 40 | 7.3 | 560 | 40 | 7.4 | 350 |
| J | 48 | 8.1 | 460 | 44 | 5.8 | 210 |
| K* | 46 | 7.2 | 490 | 42 | 6.4 | 250 |
| N | 42 | 8.6 | 630 | 50 | 4.1 | 100 |
| O* | 43 | 9.5 | 620 | 49 | 6.3 | 170 | b. Shore A hardness (according to DIN 53 505) of the silicone rubber samples before and after thermal treatment by open storage for 10 d, 20 d, 30 d, 40 d, 50 d and 100 d, unless the sample became prematurely brittle, at a temperature of 250° C. in a forced-draught oven. Shore A values of the silicone rubbers prepared using metal-containing silicas before and after thermal treatment are summarized by way of example in Table III (cf. Table III).

TABLE III

Shore A hardness before and after thermal treatment

| Silica | without thermal treatment | 10d/ 250° C. | 20d/ 250° C. | 30d/ 250° C. | 40d/ 250° C. | 50d/ 250° C. | 100d/ 250° C. |
|---|---|---|---|---|---|---|---|
| without addition | 41 | 65 | 87 | brittle | — | — | — |
| C | 44 | 50 | 59 | 65 | 69 | 74 | 83 |
| D* | 43 | 45 | 54 | 58 | 61 | 66 | 74 |
| F | 44 | 55 | 63 | 68 | 71 | 74 | 81 |
| G* | 43 | 52 | 58 | 63 | 65 | 68 | 78 |
| H | 38 | 58 | 66 | 76 | 79 | 82 | 94 |
| I* | 39 | 57 | 63 | 71 | 73 | 75 | 84 |
| J | 47 | 46 | 52 | 59 | 61 | 68 | 83 |
| K* | 45 | 45 | 48 | 52 | 57 | 60 | 77 |
| N | 41 | 61 | 77 | 82 | 87 | 90 | brittle |
| O* | 43 | 63 | 72 | 76 | 79 | 84 | brittle | c. Magnitude of the dynamic modulus under compression. (according to DIN 53 513; mean strain: −2% strain amplitude: 0.5%; measurement frequency: 10 Hz) . The modulus measurements were carried out on cylindrical silicone rubber samples (height: 6 mm; diameter: 10 mm) before and after thermal treatment by open storage for 5 d, 10 d, 20 d, 30 d and 40 d at a temperature of 250° C. in a forced-draught oven. 5 samples per material were measured, and the dynamic modulus was determined by calculating the arithmetic mean of the individual measurements. Corresponding data are listed in Table IV.

TABLE IV

Dynamic modulus (in MPa) before and after thermal treatment

| Silica | without thermal treatment | 5d/ 250° C. | 10d/ 250° C. | 20d/ 250° C. | 30d/ 250° C. | 40d/ 250° C. |
|---|---|---|---|---|---|---|
| without addition | 3.05 | 8.36 | 21.04 | 104.01 | 142.19 | brittle |
| C | 3.11 | 2.38 | 3.22 | 5.03 | 6.51 | 8.37 |
| D* | 3.07 | 2.20 | 2.93 | 4.18 | 5.19 | 6.42 |
| F | 3.95 | 3.29 | 4.21 | 5.63 | 7.32 | 8.40 |
| G* | 3.81 | 3.56 | 3.94 | 5.07 | 6.48 | 7.91 |
| H | 2.77 | 3.98 | 5.92 | 8.53 | 11.46 | 14.19 |
| I* | 2.89 | 4.81 | 6.31 | 8.29 | 10.75 | 12.82 |
| J | 3.70 | 2.93 | 2.95 | 3.78 | 4.83 | 6.23 |
| K* | 3.31 | 2.66 | 2.76 | 3.32 | 3.94 | 5.09 |
| L | 3.10 | 2.59 | 2.17 | 3.44 | 5.12 | 6.85 |
| M* | 3.29 | 2.51 | 2.48 | 3.37 | 4.40 | 5.63 | d. The percentage weight loss of the cylindrical samples described under c after thermal treatment by open storage for 5 d, 10 d, 20 d, 30 d, 40 d and 50 d at a temperature of 250° C. in a forced-draught oven, the percent age weight loss once again being determined by calculating the arithmetic mean of the 5 individual measurements carried out per material. The percentage weight losses due to thermal treatment of the silicone rubber samples prepared using metal-containing silicas are summarized by way of example in Table V.

TABLE V

| | Percentage weight loss due to thermal treatment | | | | | |
|---|---|---|---|---|---|---|
| Silica | 5d/250° C. Treatment | 10d/ 250° C. | 20d/ 250° C. | 30d/ 250° C. | 40d/ 250° C. | 50d/ 250° C. |
| without addition | 3.8 | 7.5 | 10.6 | 13.2 | brittle | — |
| F | 3.0 | 3.7 | 4.8 | 5.7 | 7.1 | 8.0 |
| N | 2.3 | 3.0 | 4.6 | 6.1 | 8.4 | 11.5 |
| O* | 2.5 | 3.1 | 4.2 | 5.3 | 6.8 | 8.8 |

What is claimed is:

1. A white, organosilicon-hydrophobicized hydrophobic silica having a BET specific surface area of 40 to 450 $m^2/g$, a carbon content of at least 0.5% by weight and a transition metal content of 10 to 10,000 ppm by weight.

2. A silica as claimed in claim 1, wherein the transition metal is cerium, iron, hafnium, copper, zinc, manganese, nickel, titanium or zirconium.

3. A process for the preparation of the silica as claimed in claim 1, in which a hydrophilic silica is mixed with
   (a) a transition metal compound which is liquid or dissolved in water or in an organic solvent and
   (b) an organosilicon water repellant.

4. An addition-crosslinking 2-component silicone rubber material which contains the silica as claimed in claim 1.

5. A white hydrophobic silica having a BET specific surface area of 40 to 450 $m^2/g$, a carbon content of at least 0.5% by weight, and a transition metal content of 10 to 10,000 ppm by weight, prepared by the process comprising:
   a) contacting hydrophilic silica with a composition containing a liquid transition metal compound or a solution of a transition metal compound;
   b) concurrent with or following said contacting, adding an organic or organosilicon water repellant compound to form a mixture;
   c) heating said mixture at an elevated temperature such that a hydrophobic, transition metal-containing silica product is obtained.

6. An addition-crosslinking 2-component silicone rubber material which contains the hydrophobic silica of claim 5.

7. An addition-crosslinking 2-component silicone rubber material which contains a hydrophobic silica having a BET specific surface area of 40 to 450 $m^2/g$, a carbon content of at least 0.5% by weight and a transition metal content of 10 to 10,000 ppm by weight.

* * * * *